United States Patent
Richards et al.

(10) Patent No.: US 10,715,475 B2
(45) Date of Patent: Jul. 14, 2020

(54) DYNAMIC ELECTRONIC MAIL ADDRESSING

(71) Applicant: Enveloperty LLC, Colorado Springs, CO (US)

(72) Inventors: Matthew D. Richards, Colorado Springs, CO (US); David T. Richards, Colorado Springs, CO (US)

(73) Assignee: Enveloperty LLC, Colorado Springs, CO (US)

( * ) Notice: Subject to any disclaimer, the term of this patent is extended or adjusted under 35 U.S.C. 154(b) by 0 days.

(21) Appl. No.: 16/551,097

(22) Filed: Aug. 26, 2019

(65) Prior Publication Data
US 2020/0076761 A1    Mar. 5, 2020

Related U.S. Application Data

(60) Provisional application No. 62/723,633, filed on Aug. 28, 2018.

(51) Int. Cl.
*G06F 15/16*    (2006.01)
*H04L 12/58*    (2006.01)

(52) U.S. Cl.
CPC .............. *H04L 51/28* (2013.01); *H04L 51/12* (2013.01); *H04L 51/22* (2013.01)

(58) Field of Classification Search
USPC ......................................................... 709/206
See application file for complete search history.

(56) References Cited

U.S. PATENT DOCUMENTS

| | | | |
|---|---|---|---|
| 5,930,479 A | 7/1999 | Hall | |
| 6,052,709 A * | 4/2000 | Paul ..................... | G06Q 10/107 709/202 |
| 6,321,267 B1 | 11/2001 | Donaldson | |
| 6,496,885 B1 * | 12/2002 | Smart ..................... | H04L 29/06 710/100 |
| 6,732,149 B1 * | 5/2004 | Kephart ............... | G06Q 10/107 709/206 |

(Continued)

FOREIGN PATENT DOCUMENTS

WO    2005/010715 A2    3/2005

OTHER PUBLICATIONS

Hall, Robert J., "How to Avoid Unwanted Email", Communications of the ACM, Mar. 1998, vol. 41, No. 3, pp. 88-95.

(Continued)

*Primary Examiner* — Alicia Baturay
(74) *Attorney, Agent, or Firm* — Martensen IP

(57) ABSTRACT

A system and method for dynamic email addressing is disclosed. A proprietary mail transfer agent and processors within a proprietary environment including a persona processor enable email users to define email addresses, both in terms of which email addresses are recognized or not, and which email addresses should be organized according to persona. In another aspect, email users choose to be conditionally notified of the arrival of a new message via push notifications. Users choose to receive push notifications only for personas users deem important enough to interrupt current activity. According to an embodiment, push notifications are generated and sent via any current user communication channel.

25 Claims, 13 Drawing Sheets

(56) References Cited

U.S. PATENT DOCUMENTS

| | | | | |
|---|---|---|---|---|
| 7,039,678 B1* | 5/2006 | Halahmi | H04L 65/4069 | 709/206 |
| 7,117,358 B2* | 10/2006 | Bandini | H04L 51/12 | 713/153 |
| 7,149,704 B2* | 12/2006 | Martin | G06Q 30/02 | 705/7.32 |
| 7,181,488 B2* | 2/2007 | Martin | G06Q 30/02 | 705/52 |
| 7,319,858 B2* | 1/2008 | Lewis | H04L 29/06 | 340/7.29 |
| 7,389,413 B2* | 6/2008 | Bandini | G06Q 10/107 | 713/153 |
| 7,401,148 B2* | 7/2008 | Lewis | H04L 29/06 | 709/204 |
| 7,454,195 B2* | 11/2008 | Lewis | G06Q 20/102 | 455/412.1 |
| 7,487,262 B2* | 2/2009 | Cardina | H04L 29/06 | 709/246 |
| 7,546,349 B1 | 6/2009 | Cooley | | |
| 7,549,096 B2* | 6/2009 | McNamara | H04L 12/2856 | 714/18 |
| 7,593,515 B2* | 9/2009 | Balk | H04L 51/34 | 379/90.01 |
| 7,613,777 B2* | 11/2009 | Giles | H04L 51/12 | 709/206 |
| 7,617,328 B2* | 11/2009 | Lewis | H04L 12/2856 | 709/206 |
| 7,657,253 B2* | 2/2010 | Lewis | H04L 45/04 | 455/412.2 |
| 7,711,786 B2* | 5/2010 | Zhu | G06Q 10/107 | 709/206 |
| 7,774,411 B2* | 8/2010 | LeMay | H04L 63/045 | 709/206 |
| 7,783,741 B2 | 8/2010 | Hardt | | |
| 7,793,334 B2* | 9/2010 | Lewis | H04W 12/0808 | 726/2 |
| 7,979,492 B2* | 7/2011 | Plow | H04L 51/28 | 709/206 |
| 8,166,161 B1* | 4/2012 | Gannu | H04L 63/0245 | 709/206 |
| 8,238,882 B2* | 8/2012 | Tysowski | H04M 1/72552 | 455/412.2 |
| 8,239,458 B2* | 8/2012 | Agarwal | G06Q 10/107 | 709/206 |
| 8,490,185 B2* | 7/2013 | Gillum | H04L 51/12 | 715/752 |
| 8,566,401 B1* | 10/2013 | Hernacki | G06Q 10/107 | 709/204 |
| 8,635,342 B2* | 1/2014 | Surendranath | H04L 51/22 | 709/206 |
| 8,650,245 B1* | 2/2014 | Ashley | H04L 51/12 | 709/203 |
| 8,660,537 B2* | 2/2014 | Lewis | H04L 29/06 | 455/412.1 |
| 8,667,074 B1* | 3/2014 | Farkas | H04L 51/22 | 709/206 |
| 8,719,360 B1* | 5/2014 | Farkas | H04L 51/28 | 709/206 |
| 8,914,883 B2* | 12/2014 | Windsor | H04L 63/1441 | 726/22 |
| 8,918,466 B2* | 12/2014 | Yu | H04L 51/28 | 709/206 |
| 9,137,032 B2* | 9/2015 | Chandak | H04L 12/1859 | |
| 9,172,668 B2* | 10/2015 | Farkas | H04L 51/14 | |
| 9,270,629 B2* | 2/2016 | Eichinger | H04L 51/28 | |
| 9,686,308 B1 | 6/2017 | Srivastava | | |
| 10,263,779 B2* | 4/2019 | Wu | H04L 63/0435 | |
| 10,356,171 B1* | 7/2019 | Baturin | H04L 69/16 | |
| 2002/0129111 A1* | 9/2002 | Cooper | H04L 51/28 | 709/207 |
| 2002/0152272 A1 | 10/2002 | Yairi | | |
| 2003/0172118 A1* | 9/2003 | Bilansky | H04L 51/38 | 709/206 |
| 2004/0177120 A1* | 9/2004 | Kirsch | H04L 29/06 | 709/206 |
| 2005/0015451 A1 | 1/2005 | Sheldon et al. | | |
| 2005/0081059 A1* | 4/2005 | Bandini | H04L 51/12 | 726/4 |
| 2005/0132060 A1* | 6/2005 | Mo | H04L 51/12 | 709/227 |
| 2005/0204011 A1* | 9/2005 | Velayudham | H04L 61/303 | 709/206 |
| 2006/0053203 A1* | 3/2006 | Mijatovic | H04L 51/12 | 709/206 |
| 2006/0106914 A1 | 5/2006 | Plow et al. | | |
| 2009/0144374 A1 | 6/2009 | Laborde | | |
| 2009/0319629 A1* | 12/2009 | de Guerre | G06Q 10/107 | 709/206 |
| 2010/0287246 A1 | 11/2010 | Klos et al. | | |
| 2014/0068458 A1* | 3/2014 | Kim | H04L 51/08 | 715/752 |
| 2014/0082105 A1* | 3/2014 | Du | G06F 15/16 | 709/206 |
| 2016/0014068 A1* | 1/2016 | Farkas | H04L 51/28 | 709/206 |
| 2017/0063761 A1* | 3/2017 | Tan | H04L 51/38 | |
| 2018/0007071 A1* | 1/2018 | Sander | H04L 63/1416 | |
| 2018/0013774 A1* | 1/2018 | Sander | H04L 63/1441 | |
| 2019/0007426 A1* | 1/2019 | Bergstrom | H04L 51/12 | |
| 2019/0036930 A1* | 1/2019 | Bartik | H04L 63/20 | |
| 2019/0075121 A1* | 3/2019 | Dutta | H04L 51/12 | |
| 2019/0132273 A1* | 5/2019 | Ryan | H04L 63/1466 | |

OTHER PUBLICATIONS

Gain airtight control over your email. Throttle, Copyright 2015-2018, Website Screen Captures [retrieved on Aug. 27, 2019]. Retrieved from the Internet: <URL: https://throttlehq.com/>.

Enveloperty LLC; "International Search Report and Written Opinion of the International Searching Authority"; PCT International Application No. PCT/US2019/048453; dated Nov. 19, 2019.

* cited by examiner

PERSONA DETAIL

- PERSONA NAME (BIG BOX STORE)
- DISPLAY NAME (USER'S NAME AS USER WISHES OTHERS TO SEE IT, E.G., JOHN DOE)
- CURRENT EMAIL ADDRESS (XYZ456@EXAMPLE.COM)
  - USED TO SEND AND RECEIVE EMAILS AND DETERMINE THE PERSONA TO WHICH A MESSAGE IS ADDRESSED
- TRUSTED SENDERS
  - EMAIL ADDRESSES THAT THE USER TRUSTS TO SEND MESSAGES TO THIS PERSONA, USED TO DETECT MALICIOUS EMAILS AND AUTOMATICALLY ADDRESS MESSAGES WHEN THEY ARE BEING COMPOSED
- SENDER FILTERS, SUBJECT FILTERS, AND OTHER FILTERS
  - ADDITIONAL INFORMATION USED TO DETERMINE THE APPROPRIATE PERSONA FOR A MESSAGE, USEFUL WHEN THE USER DESIRES MESSAGES TO THE SAME ADDRESS TO BE FURTHER SUBDIVIDED INTO DIFFERENT PERSONAS
- PREVIOUS EMAIL ADDRESSES (ABC123@EXAMPLE.COM, ABAB@EXAMPLE.COM)
  - USED TO GROUP EMAILS SENT TO PREVIOUS ADDRESSES FROM BIG BOX STORE
- TAGS ("STORES", "WEBSITES", "HOME IMPROVEMENT")
  - USED TO CATEGORIZE, SEARCH, AND FILTER PERSONAS
- ANCILLARY INFORMATION (E.G., WEBSITE URL, LOGIN CREDENTIALS, SECURITY QUESTIONS AND ANSWERS, SOCIAL MEDIA HANDLES)
  - USED TO FACILITATE ONLINE INTERACTION
- PROCESSING DETAILS (FOLDER TO STORE MESSAGE, WHETHER TO SEND A PUSH NOTIFICATION TO THE USER, WHETHER TO DELETE, REPLY, FORWARD, SCHEDULE A REMINDER, SANITIZE, SAVE ATTACHMENTS, WHICH SERVER TO SEND MESSAGES THROUGH, ETC.)

FIG.8

DYNAMIC ELECTRONIC MAIL ADDRESSING

RELATED APPLICATIONS

This application claims priority from US Provisional Patent Application No. 62/723,633, filed Aug. 28, 2018, which is incorporated herein in its entirety.

FIELD OF THE INVENTION

Embodiments of the present invention relate, in general, to electronic mail addressing and more particularly to systems and method for dynamically addressing electronic mail.

BACKGROUND

Junk mail, spam, solicitations, notifications, and other unwanted electronic communications are a byproduct of a growing reliance on e-commerce. In most instances any transaction that occurs online seeks or requires an electronic address to confirm an order, verify credentials, or aid in tracking shipping. Invariably those addresses are used to engulf a user's inbox with offers, solicitations, spam, and even malicious email seeking to illicitly steal information, harass or even threaten.

In a corporate environment in which each employee has both at least one personal email account and at least one "work" email account it is increasingly desirable to intelligently manage email accounts so as to minimize security issues, minimize employee downtime issues, and increase confidence in email management. Described herein are systems and methods for configurable email management that address the above-referenced concerns.

The email management systems and methods as described herein allow anyone using email clients, from individuals to large corporations, to more efficiently and securely handle email communications from/to multiple sources FIG. 1 is an illustration of a prior art system showing the general relationship to clients 203, 206, and 207 to multiple mail transfer agents (MTAs) 105, and data store 106. Clients 203, 206, and 207 as illustrated here are essentially the same type of software application for making email possible on different devices. Whether the email client is running on a PC (client 203), a cell phone (client 206), or a tablet (client 207), the client represents an executable application on the user device that makes it possible for the user to access email. Data store 106 in this figure represents any electronic medium that stores emails sent and received, and to which clients directly communicate to access emails sent and received (and also contacts, etc., depending upon the MTA provider and the relationship between the MTA provider and the individual who is operating the client). In order for anyone to send an email communication it must be sent from one MTA 105 to another MTA 105. As further described and claimed below, a custom MTA improves email communications.

Email is a very useful tool but as users receive more and more unsolicited messages, the utility of such a system dwindles. Recall that after a user creates an email, according to the prior art, it is typically sent using Simple Mail Transfer Protocol (SMTP). Each message bears the address of the destination and the address of the sender. The receiving domain MTA compares the mailbox in the address to its lists of subscribed users. If a match is found the message is associated with that particular user. If not, the message is discarded, and an error message is returned to the user indicating that the message was being sent to an unknown address.

A need therefore exists to curtail and control unwanted electronic communications. A common technique to resolve this issue to simply restrict those to whom a user gives out their address. Others provide an actual but dummy email address for all commercial transactions in the hope that their real email address remains clear of any unwanted communications.

Unfortunately, leaks occur, friends share email addresses and eventually even the most private of email inboxes are again crowded with unwanted communications. What is needed is a reliable means by which to identify from which source unwanted email is being generated and the ability to curtail that source of electronic communications without impacting the use of the same email inbox for other, legitimate users. These and other deficiencies of the prior art are addressed by one or more embodiments of the present invention.

Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out in the appended claims.

BRIEF DESCRIPTION OF THE DRAWINGS

The aforementioned features and other features and objects of the present invention and the manner of attaining them will become more apparent, and the invention itself will be best understood, by reference to the following description of one or more embodiments taken in conjunction with the accompanying drawings.

The Figures depict embodiments of the present invention for purposes of illustration only. One skilled in the art will readily recognize from the following discussion that alternative embodiments of the structures and methods illustrated herein may be employed without departing from the principles of the invention described herein.

FIG. 8 sets out details regarding the definition and concept of "Persona" in the context of the current system and method.

DETAILED DESCRIPTION

A dynamic electronic addressing system enabling a user to manage electronic messages from a plurality of senders by using a plurality of addresses sent to a single domain is described herein. Each of the plurality of addresses are, according to one embodiment, associated with a Persona which aids the user to identify the specific channel by which the email has arrived.

Embodiments of the present invention are hereafter described in detail with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

Figure 2:
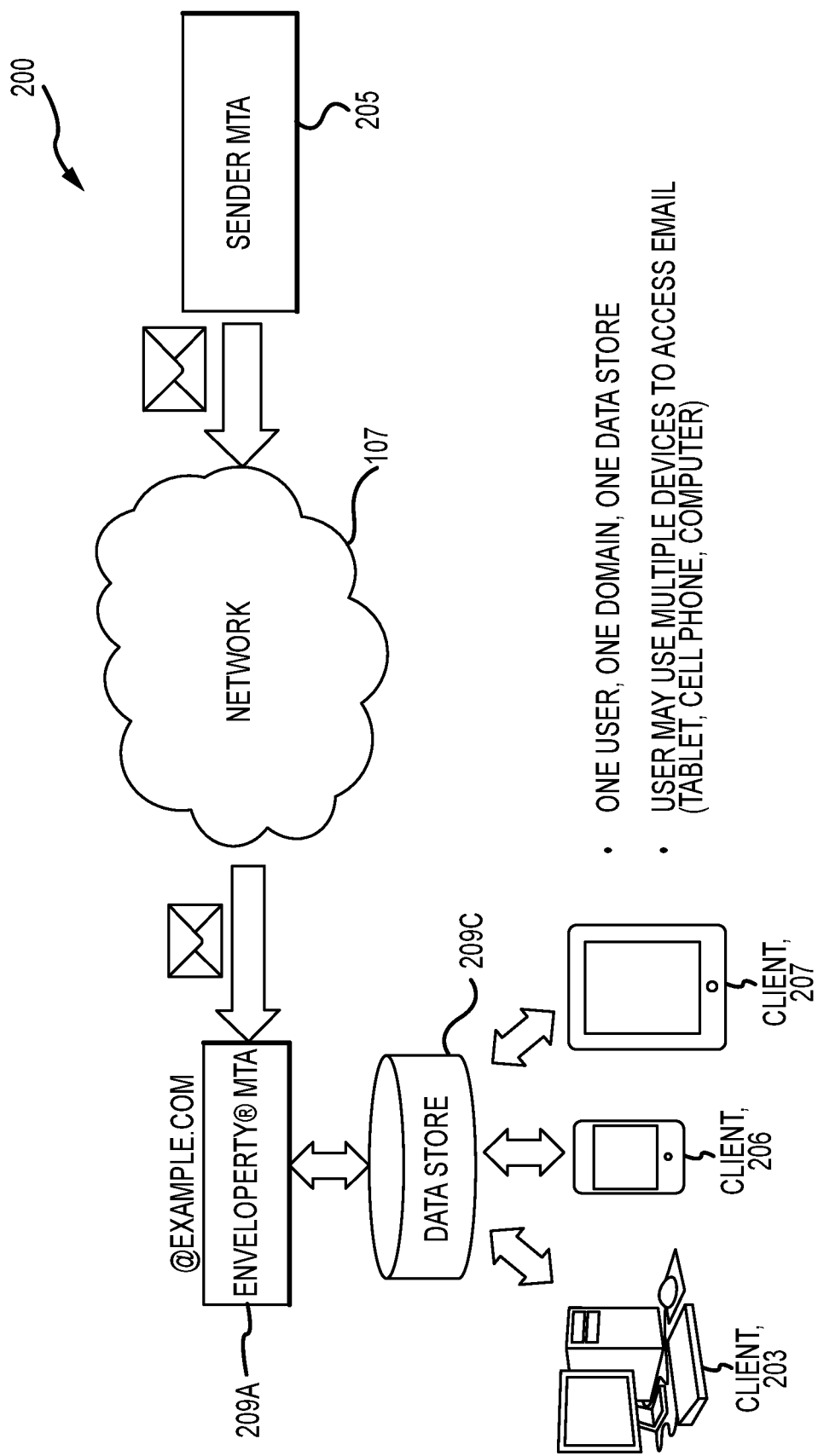
FIG. 2 is a diagram of one embodiment of the current system and method as employed with a single domain and data store.
Figure 2A:
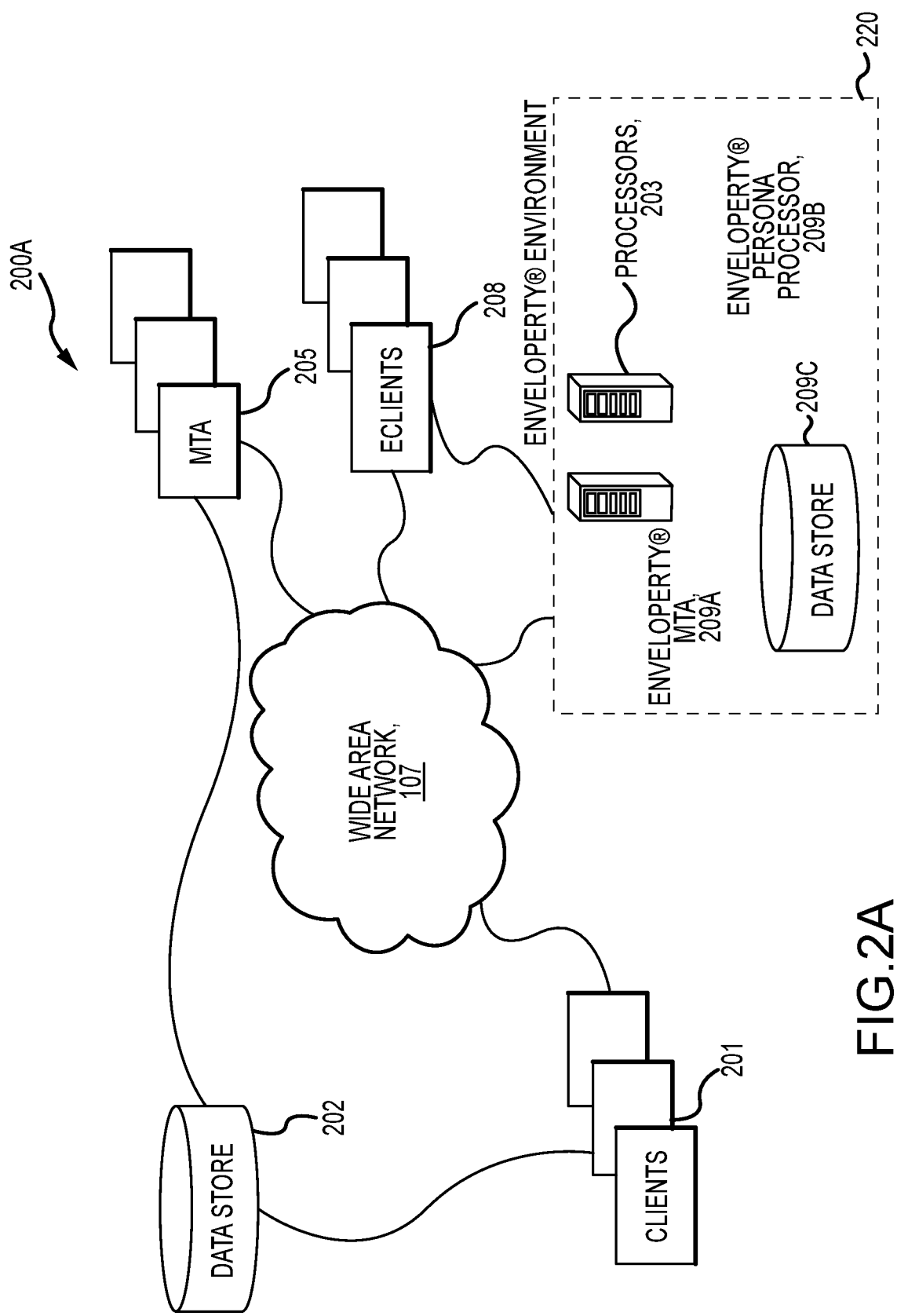
FIG. 2A is a diagram of an email system according to an embodiment.

Referring to FIG. 2A, a diagram of one embodiment 200A of the current system and method is illustrated. Customers/users can subscribe to a particular email system and service as described and claimed herein. For ease of reference, the email system and service are referred to as Enveloperty®. Enveloperty® maintains a proprietary Enveloperty® MTA (EMTA).

Various MTAs 205 communicate with one or more data stores 202 and one or more clients/users 201. The terms "client" and "user" will be used interchangeably herein. In general, a client refers to hardware and software that interacts with an email system through a wide area network, and a user refers to a person who has charge of the client. For purposes of this disclosure, MTAs 205 are distinguished from the Enveloperty® MTA (EMTA) 209A as further described below. MTAs 205 have their own one or more data stores 202 to store emails, contacts, and other data related to particular clients/users 201. The interactions and communications between MTAs 205, data stores 202 and clients/users 201 occur via a wide area network 107. Wide area network (WAN) 107 includes the internet and any intermediate local networks that communicate with the internet to effectuate an email system.

Eclients 208 are Enveloperty® customers/clients of the proprietary email system and methods described herein. Eclients 208 interact with an Enveloperty® environment 220 that includes processors 203 for executing proprietary email methods. The proprietary email methods include the Enveloperty® MTA (EMTA 209A) and an Enveloperty® Persona Processor (209B). In addition, the Enveloperty® environment 220 has its own data stores 209C that store emails, contacts, and other information for eclients 208.

Figure 1:
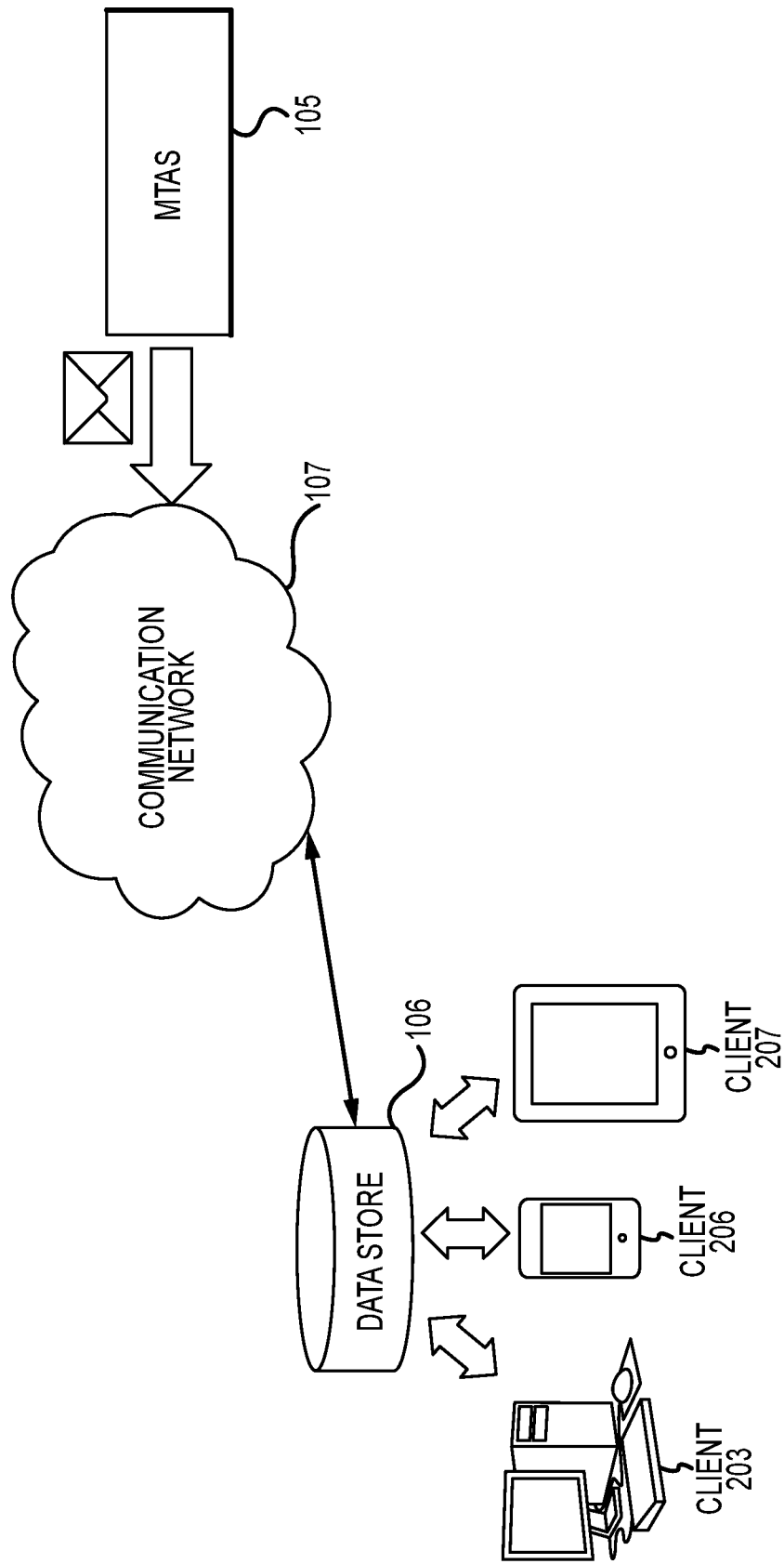
FIG. 1 is a diagram of a prior art network for email communication.

As shown, all interactions between eclients 208, the Enveloperty® environment 220, and the larger world occur through WAN 107. Eclients 208 thus access any other email addresses available through WAN 107 in the usual manner. It is also noted that eclients 208 can also be clients/users in the sense of FIG. 1 (clients 203, 206, and 207) as well as eclients 208 at the same time.

Figure 6:
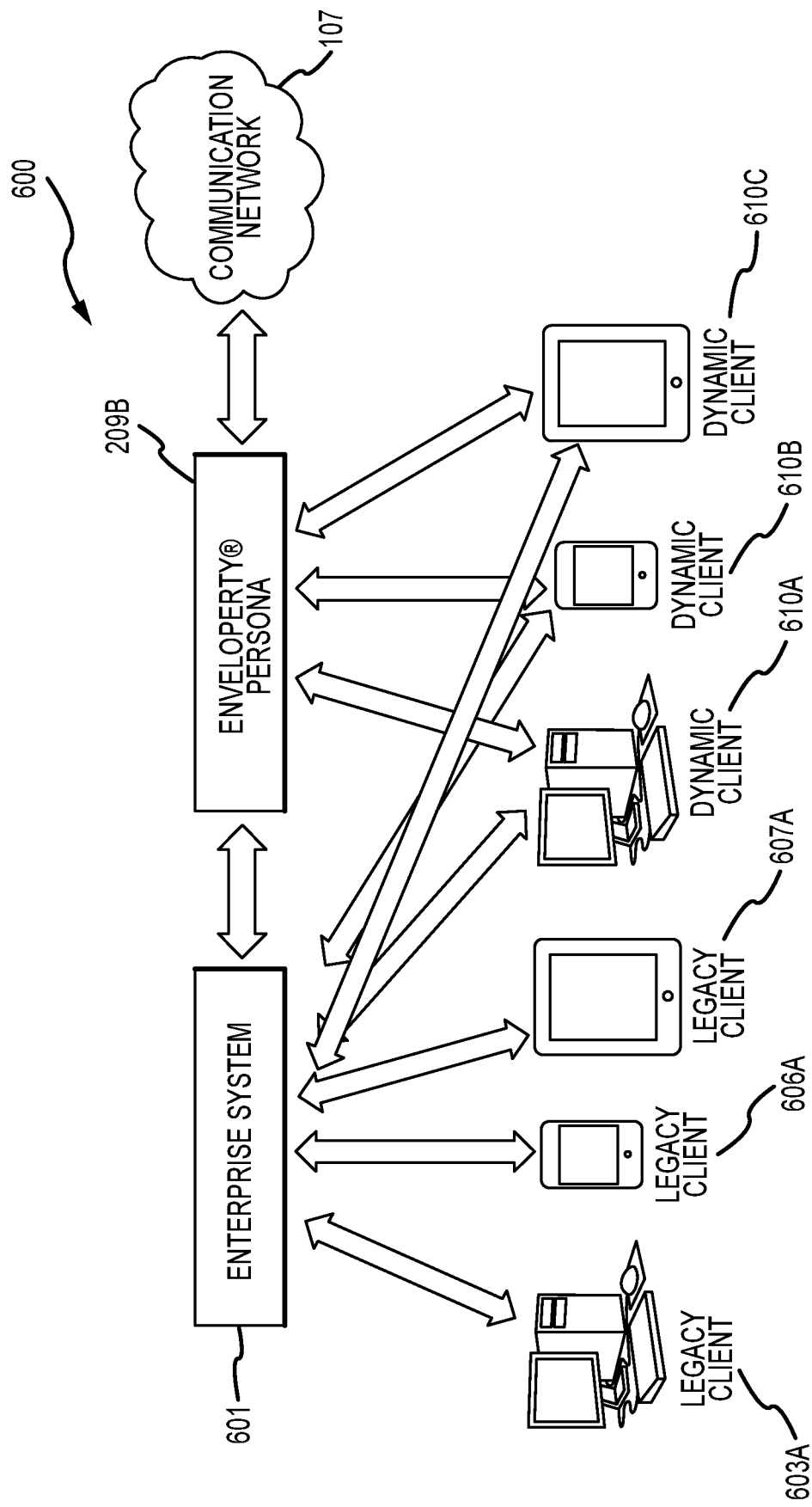
FIG. 6 is a diagram of one embodiment of the current system and method as integrated with a legacy enterprise system for all employees, including various email systems and addresses.

FIG. 2 is a diagram of one embodiment 200 of an email system as employed with a single domain and data source. System 200 is an embodiment in which there is one user, one domain (example.com), and one data store 209C. In this embodiment, the domain example.com is provided and administered by the EMTA 209A, which uses and maintains the data store 209C. The user may access the domain and use the email system through any of the client devices 203, 206, 207, or other client devices not shown. Briefly referring to the description of eclients in FIG. 2A, it is understood in all of the figures that clients/client devices 203, 206 and 207 always include eclients 208. In an embodiment, an eclient device runs software expressly designed to interoperate with the Enveloperty® system or standard client software modified to interoperate with the Enveloperty® system. Standard client software might typically be modified by the incorporation of an "add-on" or "plug-in" depending on the terminology of the client platform. Standard clients are capable of interoperating with and deriving benefit from the Enveloperty® system even if those clients have not been modified. An eclient as used herein is any client capable of accessing the Enveloperty® environment, including legacy clients and dynamic clients as seen in FIG. 6, for example. A sender MTA 205 is distinct from the EMTA 209 and sends email communications to the EMTA through the network 107.

Figure 3:
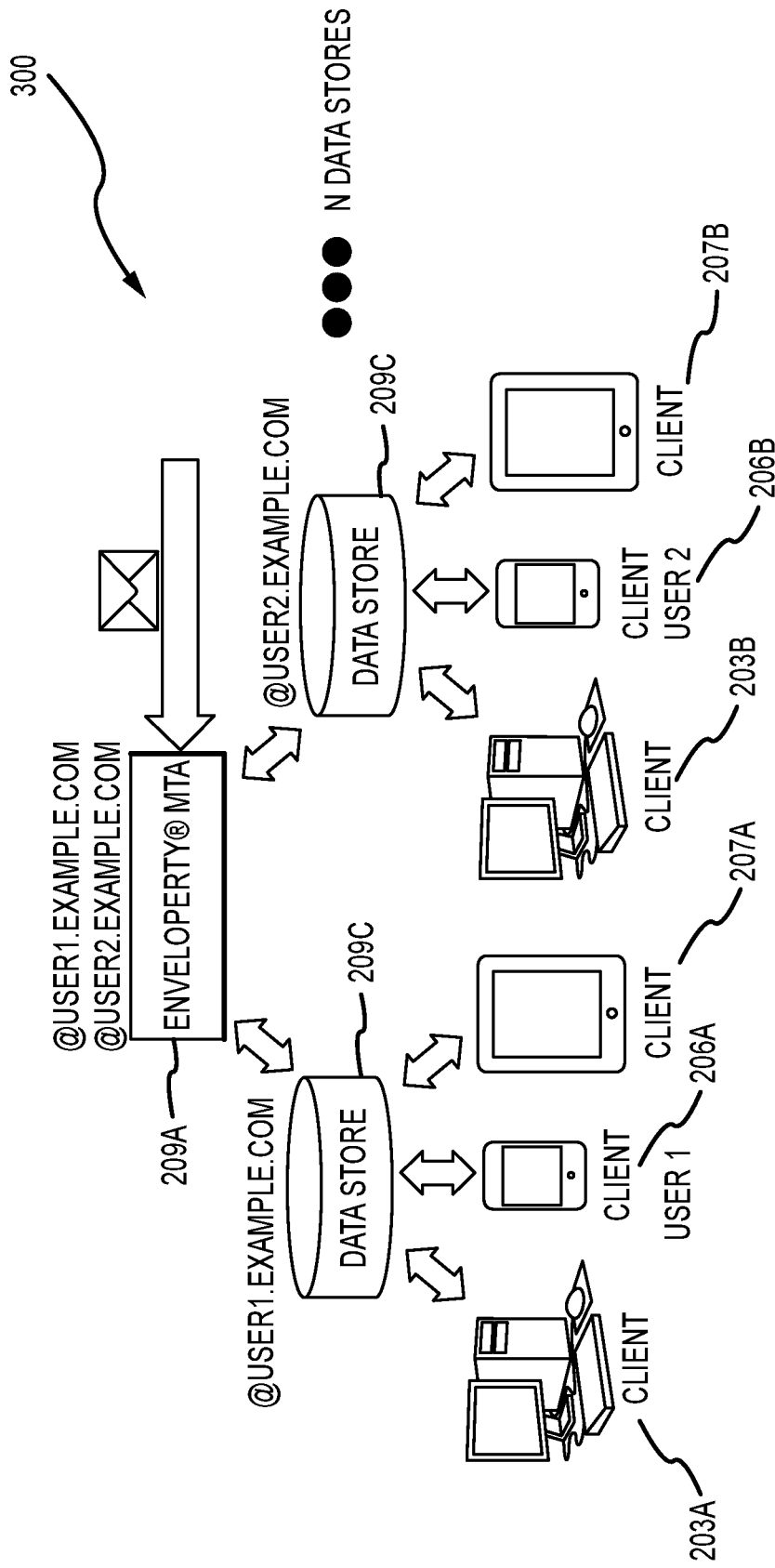
FIG. 3 is a diagram of one embodiment of the current system and method as employed with multiple subdomains and data stores.

FIG. 3 is a diagram of one embodiment 300 of an email system as employed with multiple subdomains, multiple data stores 209C, and multiple users. Email communications are shown being received by the EMTA 209A from any source. The EMTA 209A receives email communication intended for multiple domains, but just two domains, user1.example.com and user2.example.com are shown here. user1.example.com and user2.example.com each have respective data stores 209C. Physically, data stores 209C can be one data store arranged to store data for the different users, or distributed data stores that are not necessarily collocated, as is known. User 1 accesses email, contacts and other data administered by the EMTA 209A using devices 203A, 206A, and 207A. User 2 accesses email, contacts and other data administered by the EMTA 209A using devices 203B, 206B, and 207B.

Figure 4:
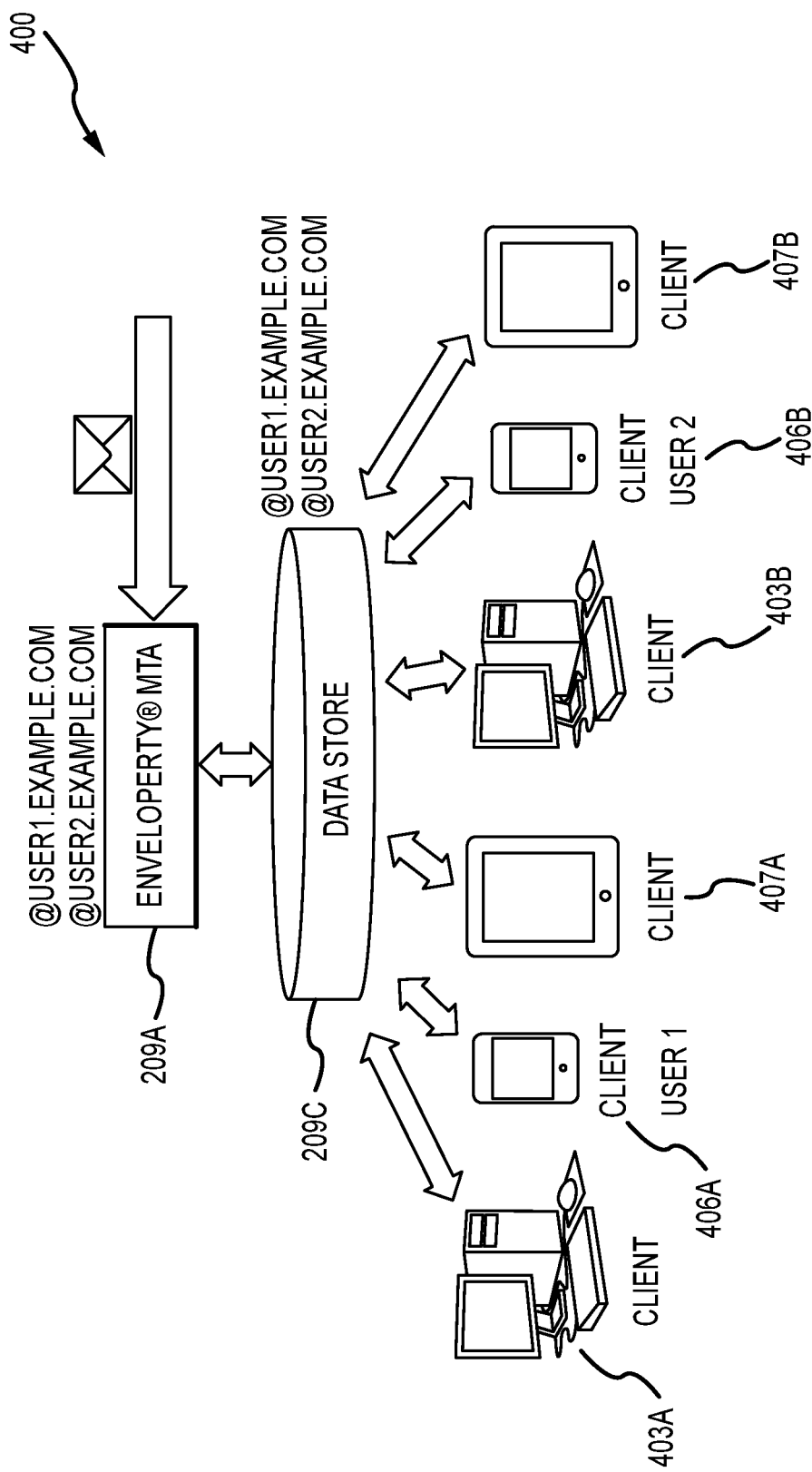
FIG. 4 is a diagram of one embodiment of the current system and method as employed with multiple subdomains and a single data store.

FIG. 4 is a diagram of one embodiment 400 of an email system as employed with multiple subdomains, a single data store 209C, and multiple users. Email communications are shown being received by the EMTA 209A from any source. The EMTA 209A receives email communication intended for multiple domains, but just two domains, user1.example.com and user2.example.com are shown here. user1.example.com and user2.example.com each use the same data store 209C, which is configured to securely allow access to respective data of multiple users. Physically, the single data store 209C can be one data store arranged to store data for the different users, or distributed data stores that are not necessarily collocated, as is known. User 1 accesses email, contacts and other data administered by the EMTA 209A using devices 403A, 406A, and 407A. User 2 accesses email, contacts and other data administered by the EMTA 209A using devices 403B, 406B, and 407B.

Figure 5:
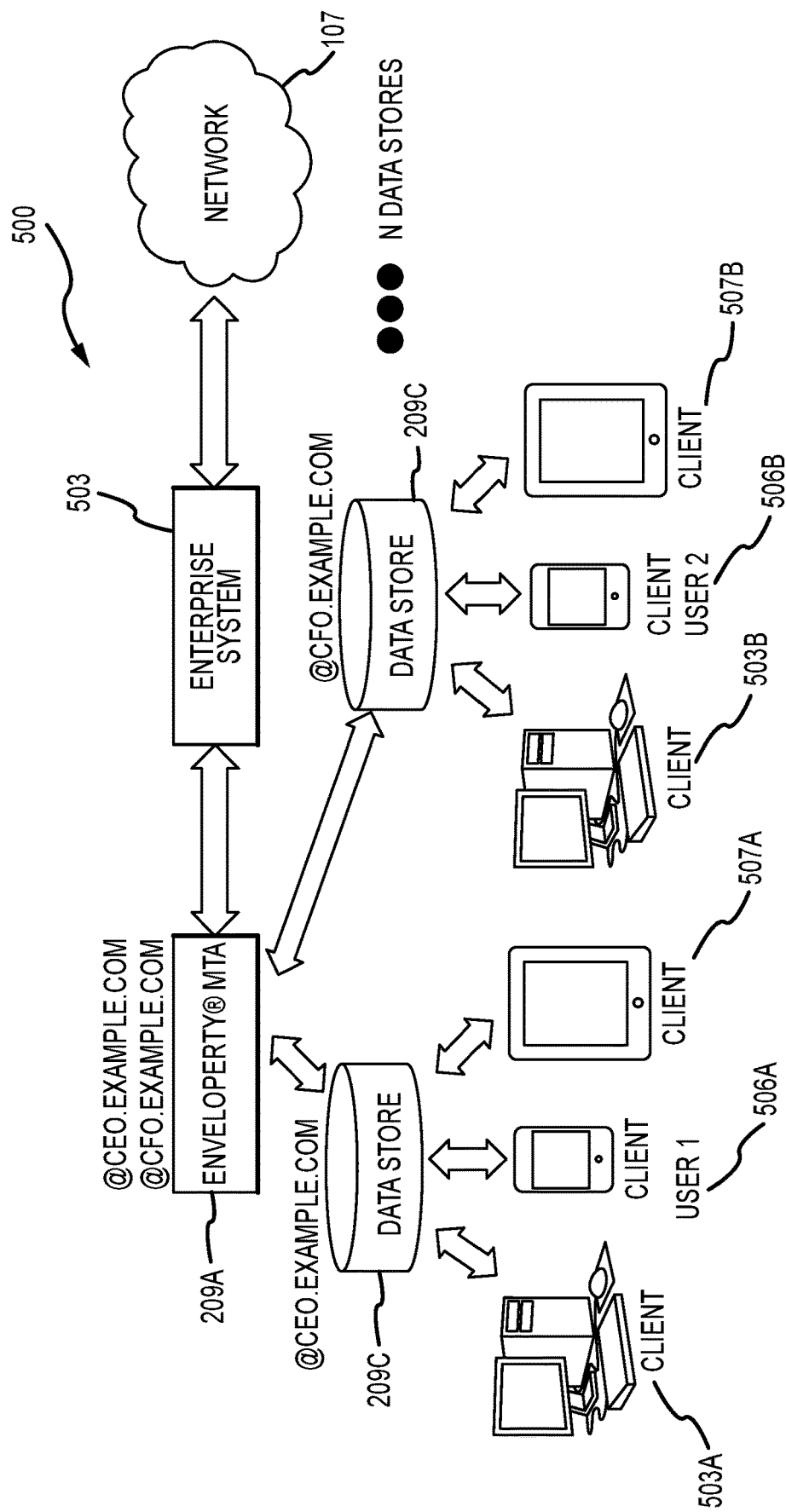
FIG. 5 is a diagram of one embodiment of the current system and method as integrated with a legacy enterprise system.

FIG. 5 is a diagram of one embodiment 500 of an email system as integrated with legacy enterprise systems. For example, the email system 500 deploys the EMTA 209A alongside the legacy email system of an enterprise so that key executives may benefit from the additional security and accountability of the EMTA 209A.

Email communications are received from network 107 into enterprise system 503. The enterprise system 503 includes any internal systems employed by the enterprise to conduct its business. These systems include email systems typically. The enterprise system 503 is in communication with the EMTA 209A. This communication can occur directly as shown, or alternatively through network 107. As shown in previous figures, EMTA 209A, as well as other elements in the figures, is always communicating via network 107.

For purposes of illustration, two user domains are shown: ceo.example.com and cfo.example.com. Each of these domains have their own data stores 209C. Each of the users "ceo" and "cfo" access data stores 209c using respective user devices 503A, 506A, and 507A (for ceo), and 503B, 506B, and 507B (for cfo).

FIG. 6 is a diagram of one embodiment 600 of an email system as integrated with legacy enterprise systems for all employees. In FIG. 6, we use a Persona Processor instead of an EMTA. All email messages for the enterprise, inbound and outbound, are routed through the Persona Processor. The Persona Processor performs the unique Enveloperty® tasks that would normally be performed in the EMTA and/or the Enveloperty® Data Store. The Persona Processor omits standard email system tasks such as message delivery and storage, as these are performed by the existing enterprise system. The EMTA and Enveloperty® Data Store must perform these tasks in addition to the unique Enveloperty® tasks.

Email communications are received from network 107 into Enveloperty® Persona Processor 209B, which is part of the Enveloperty® environment 220 (see FIG. 2A). The enterprise system 601 includes any internal systems employed by the enterprise to conduct its business. These systems include email systems typically. This communication can occur directly as shown, or alternatively through network 107. As shown in previous figures, EMTA 209A, as well as other elements in the figures, is always communicating via network 107.

For purposes of illustration, three types of clients/users are shown. These are Legacy clients/users 603A 606A and 607A, and dynamic clients/users 610A, 610B and 610C. In an embodiment, legacy clients/users only communicate with the enterprise system. In an embodiment, dynamic clients communicate with the enterprise system 601 for messaging and with the Persona Processor 209B for configuration. All messages are received from and sent through the enterprise system for all client types. Eclients/dynamic clients only communicate with the Persona Processor to update and receive configuration information. In an all Enveloperty® system, configuration information is stored in the Enveloperty® Data Store. Since this embodiment does not have an Enveloperty® Data Store, the configuration information is stored in the Persona Processor.

Figure 7:
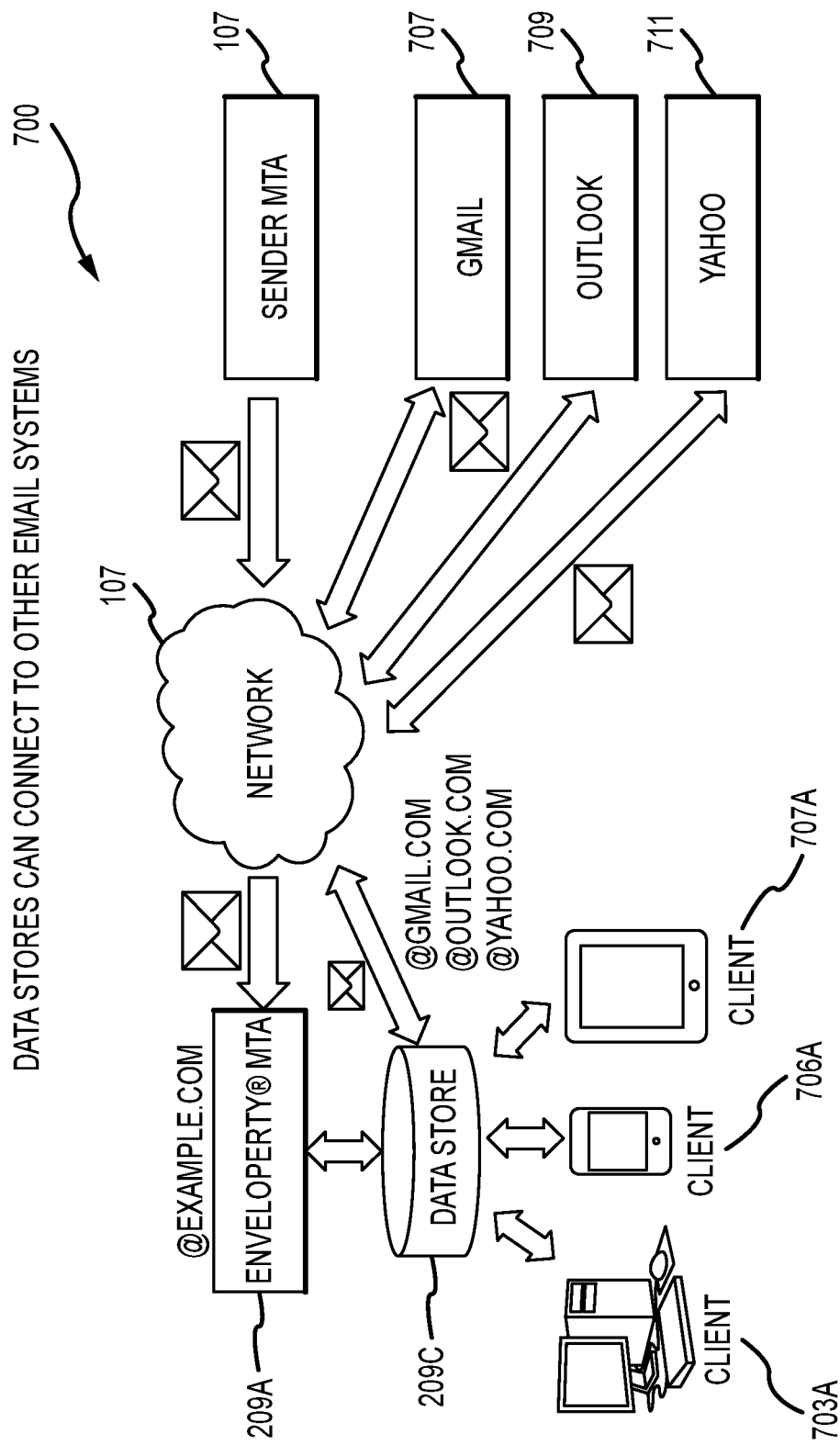
FIG. 7 is a diagram of one embodiment of the current system and method illustrating how data stores can connect to various email systems.

FIG. 7 is a diagram a diagram of one embodiment 700 of an email system that illustrates the ability of the EMTA 209A to communicate with and interact with other known email systems. Any email communications directed to an EMTA user/domain such as example.com may originate from any sender MTA 705, or other systems such as Gmail 707, Outlook 709, or Yahoo 711. These communications are received through any network 107 in the usual manner. EMTA 209A references proprietary data store 209C to store, manage and archive all email communication for the EMTA 209A domains (such as example.com). outgoing email communications from the data store to any other email systems are managed in the usual manner. The data store 209C can send and receive email directly to and from other email providers, such as Gmail, Outlook, and Yahoo when the user has accounts provided by those services. This gives the user the convenience of using these services and Enveloperty® services from the same client, instead of requiring additional clients or software applications. When the user is using services provided by non-Enveloperty® providers, the messages sent through or received from those providers do not pass through the EMTA.

Dynamic Email Addressing

With dynamic email addressing, each user typically has their own domain or subdomain. The MTA in this case does not typically check the mailbox in the destination email address, it accepts all messages for the domain(s) for which it is responsible. The messages addressed to different mailboxes are not forwarded to a single catchall mailbox but are processed as separate Personas. Messages addressed to more specific subdomains are also accepted, so the dynamic email address user may specify unique subdomains in addition to unique mailboxes. Dynamic email addressing may be implemented in various configurations, as is documented later.

Personas

Personas are primarily based on the receiving email address, and may be refined based on other factors, such as the content of other message headers, for example, the sending email address or the presence of a certain term in the subject line. A Persona is a context that makes sense to the email user. Personas may be defined by the user for any purpose, such as interacting with a specific company, organization, or website, aggregating and/or processing messages for a certain project, event, topic, or business function, etc. Users can start with the Persona when they compose a message and it can fill in the associated recipients. For example, if one is working on a project with a number of colleagues, one could select the "Project XYZ" Persona when composing a message and it would automatically address the message to everyone associated with Project XYZ.

Typically, a user assigned a domain such as example.com will create Personas by varying the mailbox as appropriate. For example:

bigboxstore example.com
    onlineretailer@example.com
    financialinstitution@example.com
    otherfinancialinstitution@example.com But users may also dynamically reference additional subdomains vendor1@vendors.example.com
    vendor2@vendors.example.com
    customer1@customers.example.com Security It is common practice to log in to web sites with an email address and password. Using the same, publicly known email address gives attackers half of the information they need to obtain unauthorized access to the web site.

Web sites typically protect passwords with techniques such as one-way hashes to ensure that passwords are not revealed in the event that their data is compromised. Email addresses are typically stored in clear text, so they are readily available to malicious actors in the event of a data compromise.

If one uses unique email addresses, it is trivial to detect the source of the compromise.

It is also trivial to detect most phishing attempts when using unique email addresses, because, in order to be successful, the attacker must send a message that is appropriate for the Persona from an address that is trusted by the Persona. Most phishing attacks will not meet either of these requirements, let alone both.

Attribution

The flip side of detecting a compromise is attributing a sales lead or introduction. For example, if one is contacted using the Persona for a colleague, one may assume that the colleague made the introduction or referral. If one is contacted using the Persona for a specific event, such as a conference, one may assume that the sales lead came pursuant to that event.

Email Change of Address

If the email address for a Persona becomes compromised, only the authorized senders to the Persona need be notified of the new email address. No other correspondents are affected.

Personalization

A business or individual may provide personalized email addresses to customers, fans, people who attend a book signing, sales prospects, etc. so that they may be given personalized attention.

Custom Notifications

A user may specify which Personas generate a notification, implying the receipt of a message that requires attention, as opposed to other messages that may be read later at a convenient time. Other custom processing is possible according to embodiments, in addition to custom notifications. For example:

Saving the message to a specific folder

Deleting the message

Automatic reply, automatic forward, automatically save an attachment.

For example, the Personas for vendors could automatically forward invoices to a bookkeeper.

Schedule a follow-up reminder

Sanitize a message by removing hyperlinks, executable code, tracking pixels, etc.

Credential Stuffing

An increasingly common malicious technique, credential stuffing, attempts to log in to many web sites using compromised credentials. Using unique email addresses to log in to each web site prevents credential stuffing from working. Additionally, selecting mailboxes with no information content (for example, abc123@example.com instead of bank@example.com to access the web site of one's bank) makes it difficult for an attacker to guess the correct email address to use to gain unauthorized access. The Persona name, seen only by the user of the Enveloperty® system, would provide a user-friendly name, such as Bank, to label an obfuscated email address such as abc123@example.com, thus relieving the user of the necessity of remembering the obscure email address.

Enhancing Other Security Systems

By allowing users to receive email at different email addresses for each sender, the Enveloperty® system creates a very strong signal for other security systems, especially those incorporating artificial intelligence or machine learning to examine network traffic and/or email messages to differentiate between authorized and unauthorized traffic or messages.

With the user's permission, senders can be notified whether their messages are configured to be dropped, if notification is enabled, etc.

Various Implementations are Possible

Static, or conventional users can share a domain with dynamic users. The static mailboxes are excepted from the dynamic email address functionality. The components of the system are compatible with several email standards, so that other software components can coexist with or replace dynamic email components.

Traditional email clients supporting Post Office Protocol version 3 (POP3) or Internet Message Access Protocol (IMAP) may send and receive messages in the system. Plugins may be created for traditional email clients to allow them to take fuller advantage of dynamic email addressing. Traditional email systems may route the traffic for some subset of users to a dynamic addressing system. For example, C-level executives and other key personnel may use dynamic addressing while the balance of the company uses the traditional system. A software component may be added to a traditional system to allow it to process and store messages using dynamic addressing. Client software designed for dynamic addressing may retrieve and send messages through such a system with much, if not all, of the functionality provided by full dynamic email systems.

For various reasons, functionality may be implemented in different components, such as the client, data store, EMTA, client plugin, Persona Processor, etc. Processing and storage may also be distributed or partitioned across multiple similar components for purposes such as horizontal scaling or security. Email may be imported from and sent through multiple other providers.

For example, a small business owner could import their personal email from a traditional email provider into a dynamic email addressing system so that messages from all systems can be stored and accessed with the same devices. Users can also share a domain. In this shared scenario, users create mailboxes in advance, and the creation process ensures that the mailbox is not in use by another user. Each user has a list of mailboxes that they own/control.

FIG. 8 lists details regarding the concept of "Persona" in the email system according to an embodiment. For this example, a Persona name is "Big Box Store". A current email address used to send and receive emails is xyz456@example.com. There are also previous email addresses used to group emails sent to previous addresses from Big Box Store, such as abc123@example.com and abab@example.com.

"Display name" indicates the name that the user wishes to display to the correspondent. Typically, it will be the user's given name, such as "John Doe", but in some contexts a user may want to use a more familiar or formal name, such as "Johnny" or "Dr. Johnathon Doe, Ph. D.". In still other contexts a user may wish to obscure their identity, such as "Customer".

"Trusted Senders" are email addresses of correspondents that the user has designated as trusted to send email messages to the given Persona. This association between Personas and correspondents allows for the easy detection of phishing attacks, because the user is warned when a message is received from an address that is not trusted. This is particularly useful because many attackers will impersonate valid sender email addresses by substituting characters that appear very similar to the human eye, such as substituting the number "0" for the letter "o" or using a character from a different alphabet, such as Cyrillic. Since the Enveloperty® system uses a computer to compare the exact address representations, the user is warned about untrusted sender addresses, even if they appear correct to the human eye. Trusted Senders may be used in combination with prior art, such as Sender Policy Framework (SPF) and DomainKeys Identified Mail (DKIM) to help ensure that a message is sent from a server authorized by the sending domain and that the message has not been tampered with.

Trusted Senders are also key to managing a plurality of email addresses by associating Personas with contacts stored in the Enveloperty® system. In the same way that the contact list/address book in an email system relieves the user of the necessity of remembering the email addresses of one's contacts, Trusted Senders relieve the user of the necessity of remembering the Persona(s) associated with a contact. Thus, when a message is composed, the appropriate Persona(s) may be recalled automatically for the user and the "from" address may be automatically populated accordingly.

"Sender filters", "Subject filters", and other filters may be used to further refine the definitions of Personas in the case where a user wants more than one Persona to be used with a single email address. For example, a user may request that all vendors send emails to "vendor@example.com" to be associated with a Vendors Persona but would like emails sent to "vendor@example.com" with the word "invoice" in the subject line to be associated with an Invoices Persona for custom processing.

"Tags" are used to categorize, search and filter among Personas within the data store 209C. For example, "stores", "websites", and "home improvement" could be tags selected by a user to organize and access their data as related to a Persona.

Ancillary information related to a Persona is used to facilitate online interaction. Ancillary information includes website URLs, login credentials, security questions and answers, and social media handles.

Another category of detail that is associated with a Persona is processing details. These include the folder to which to store particular messages, whether to delete particular messages, whether to reply, whether to forward, whether to schedule a reminder, whether to sanitize, whether to save attachments, and more.

Figure 9:
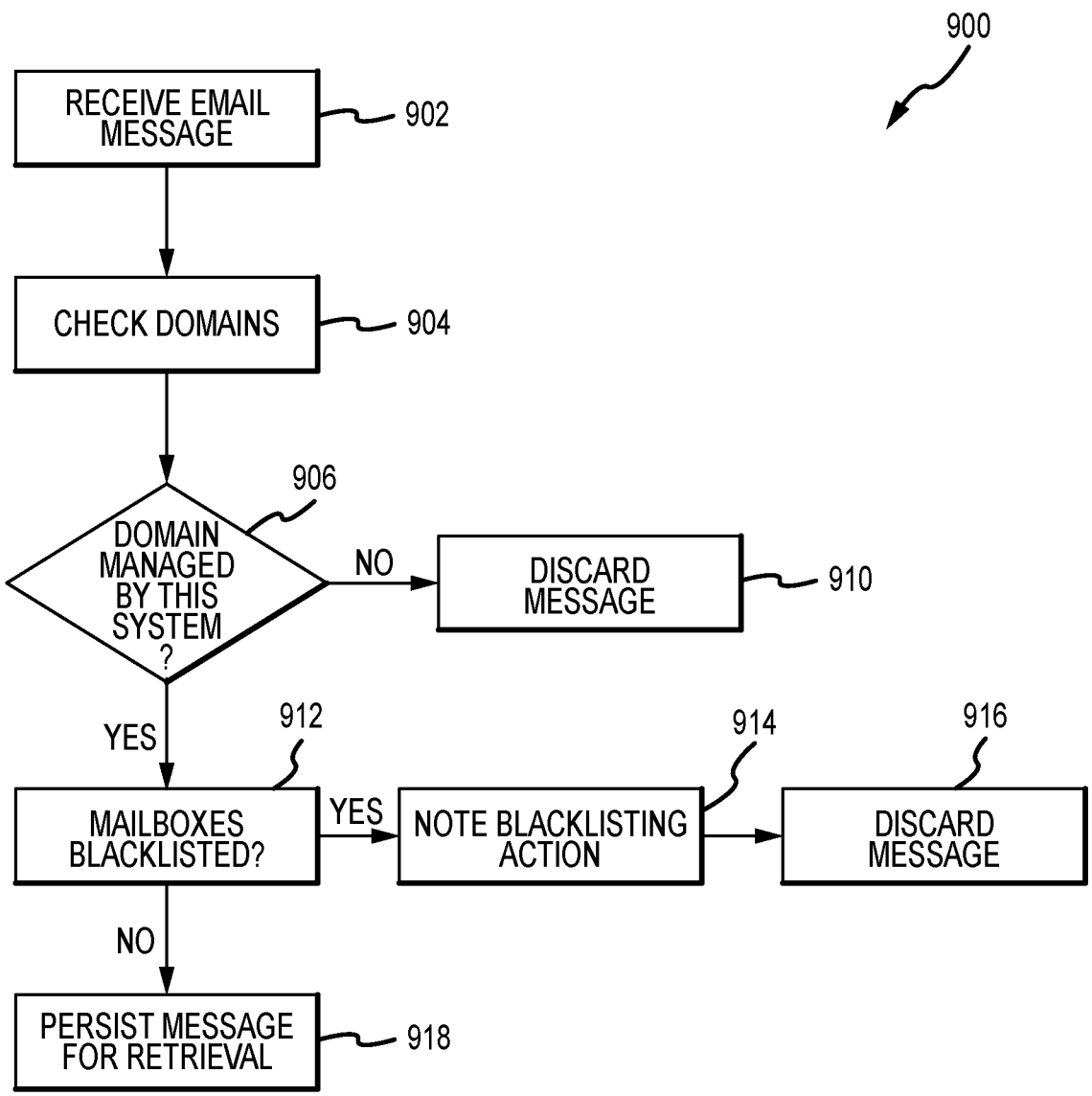
FIG. 9 is a flow diagram describing various actions taken by the current system and method.

FIG. 9 is a flow diagram 900 illustrating an email method according to an embodiment. An email is received in the EMTA at 902. Email domains are checked (904) to determine whether the domain is managed by the EMTA system (906). If the domain is not managed by the system, the message is discarded. (910). If the domain is managed by the system, it is determined whether the email address contains a blacklisted mailbox (912). If the mailbox is blacklisted, this is noted at 914, and the message is discarded (916). If the mailboxes are not blacklisted, the message is persisted for retrieval (918). Note that, in contrast to standard practice, all messages destined for non-blacklisted mailboxes are accepted, allowing previously unknown email addresses to be used without any prior configuration.

Figure 10:
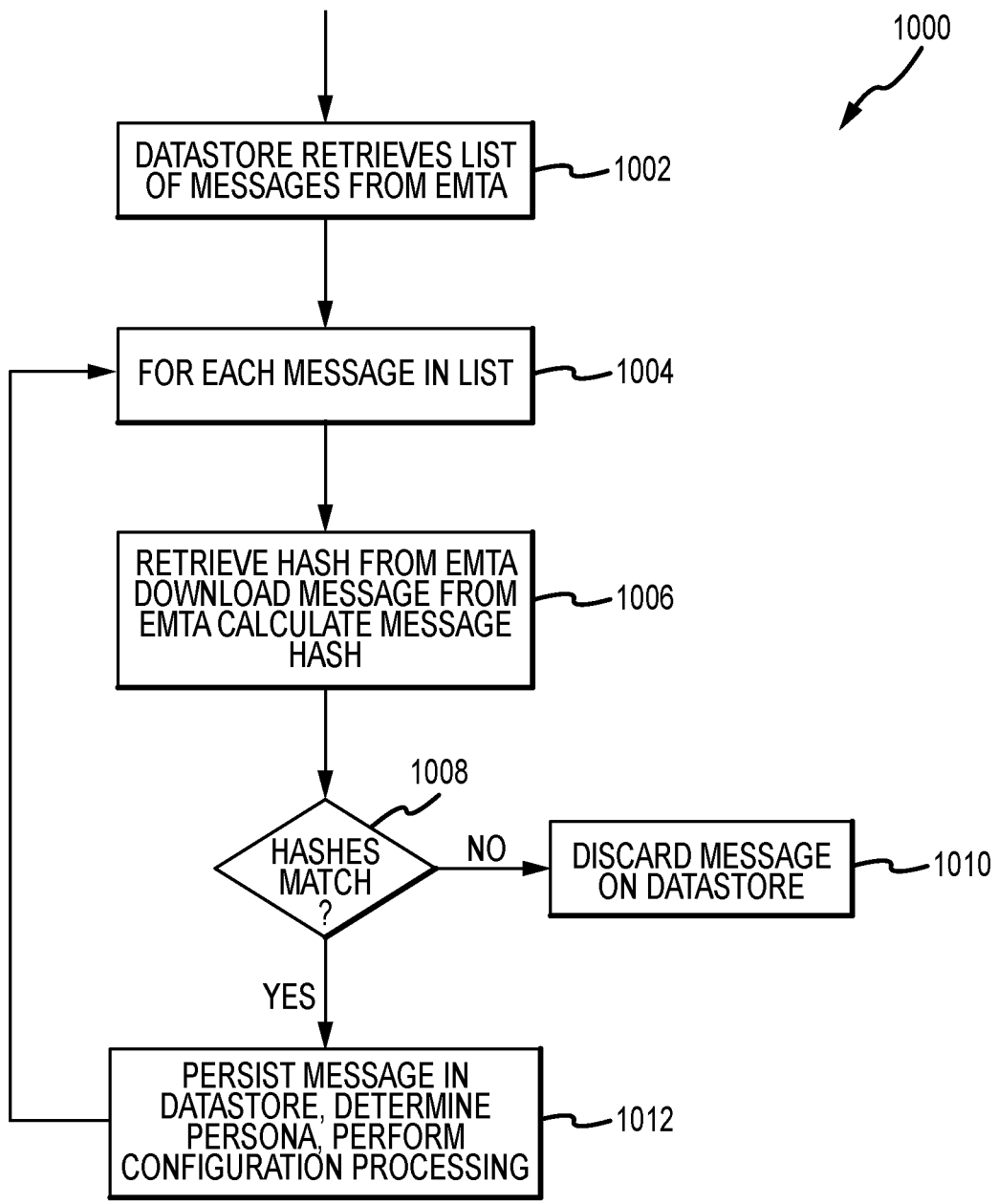
FIG. 10 is a flow diagram describing various actions taken by the current system and method.

FIG. 10 is a flow diagram 1000 illustrating a further email method according to an embodiment. At 1002, the data store 209C retrieves a list of messages from the EMTA 209A. For each message in the list (1004) a hash is retrieved from the EMTA 209A, the message is downloaded from the EMTA 209A, and the message hash is calculated (1006). Calculating hashes and checking hashes to ensure proper transmission of the message from the EMTA to the data store is employed as a good practice in this embodiment, but it is not required for dynamic email addressing.

It is determined whether the hashes match (1008). If the hashes do not match the message is discarded (1010). If the hashes match, the message is persisted in the data store (1012) 209C and the EMTA is informed that the downloaded message may be deleted from the EMTA's temporary storage.

When the message is persisted in the data store, its Persona is determined by comparing attributes of the persisted message with the currently defined Personas and any processing that the user has configured for the determined Persona, such as filing in a specific folder, is performed.

Figure 11:
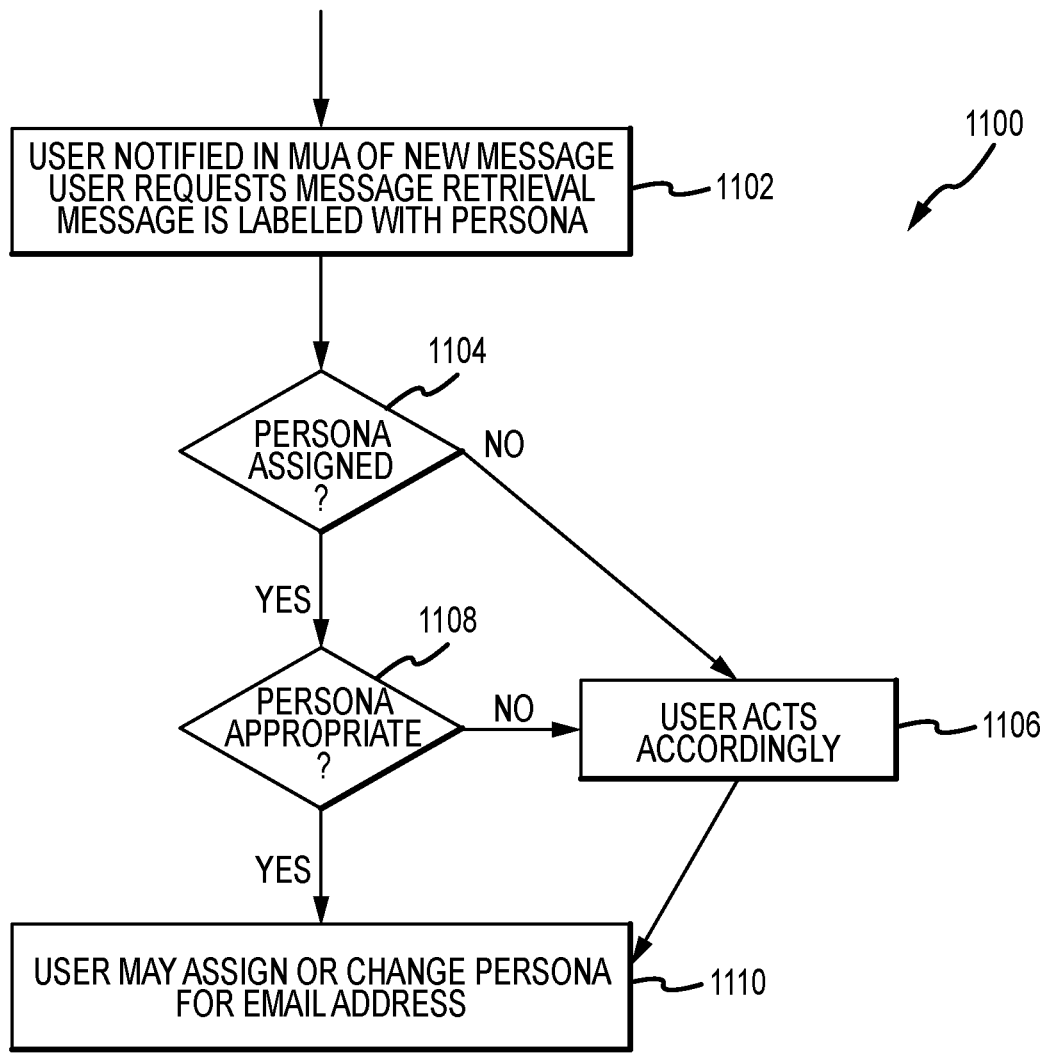
FIG. 11 is a flow diagram describing various actions taken by the current system and method.

FIG. 11 is a flow diagram 1100 illustrating a further email method according to an embodiment. At 1102, if enabled for the assigned Persona, the user is notified in the mail user agent (MUA) (in this case, the eclient) of a new message. Alternatively, the user may opt to check for new messages at their convenience, rather than being interrupted by a notification. The user can then request retrieval of the new message. The message is then labeled with the Persona by the eclient. If a Persona is not assigned (1104) the user can choose (1106) to assign or change the Persona for the email address (1110).

If the Persona is assigned (1104) and is appropriate (1108), again the user can choose (1106) to assign or change the Persona for the email address (1110). If the Persona is not appropriate (1108), e. g., the email address assigned to the Persona has been used for unauthorized purposes, the user may delete the message, blacklist the sender, blacklist the Persona, notify the authorized sender that the user's email address has been compromised, select a new email address for the Persona and notify authorized senders of the change, etc. as the user deems appropriate.

Figure 12:
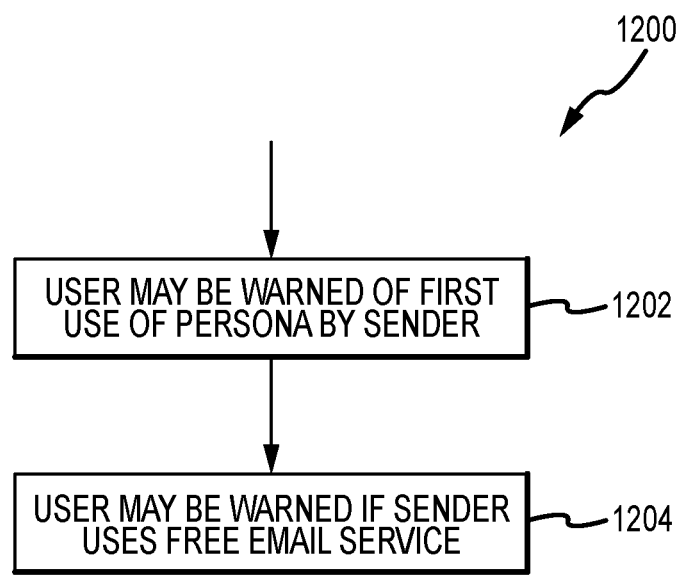
FIG. 12 is a flow diagram describing various actions taken by the current system and method.

FIG. 12 is a flow diagram 1200 illustrating a further email method according to an embodiment. Continuing from 1110, the user may be warned of the first use of a particular Persona by a sender (1202). The user may also be warned if the sender uses a free email service (1204). Other warnings or actions may be configured by the user according to their preferences.

In an embodiment, the Persona Processor modifies inbound messages to comply with the enterprise system (namely by causing the message to be delivered to the static email address assigned to the user who controls the dynamic email address and storing the dynamic email address in a special header in the message). An eclient (or standard client with an Enveloperty® plugin) will then use that dynamic email address to retrieve the correct Persona from the Persona Processor and perform the appropriate client tasks based on that Persona.

For outbound (sent) email messages, the eclient will embed the Persona in the sent message. The Persona Processor will then modify the message to use the associated dynamic email address instead of the static email address assigned by the enterprise system. The Persona Processor will then forward the modified message to the proper destination MTA.

Although most of the description is related to receiving email messages, embodiments of the invention make it much easier to send email messages as well. For example, it is easy for a user to have multiple email addresses because the user associates their correspondents with Personas. When a user wants to compose a message to someone, they can find the correspondent (recipient) in their contacts/address book and select them. If that correspondent is associated with a Persona, the "from" address in the message will be correctly populated automatically. If that correspondent is associated with multiple Personas, the user is presented with the list of Personas and selects the appropriate one, which automatically populates the "from" address.

In the same way that the address book or contacts list frees a user from remembering the email addresses of all of their contacts, because one simply looks up the contact's name and the correct address for them is used, the user is also freed from remembering the correct Persona to use, because it is associated with that contact as well.

According to an embodiment, the user is conditionally notified of the arrival of a new message via push notifications when they are available and enabled on the user's device. The figures show cases in which a user opens the eclient application/MUA and sees that a new message has been delivered. Push notifications are also a feature of the operating system of the client device. These push notifications are configured by the eclient software, but they are delivered by the system used by the client device. According to an embodiment, users can choose to only receive push notifications for Personas that they deem important enough to interrupt them. These push notifications are generated by the data store as part of the processing performed after the Persona has been determined. Any online activity can be interrupted by email notifications. In the case of push notifications, a user is often not using their phone when an email notification is sent and received. According to an embodiment, push notifications are generated and sent via any current user communication channel.

Included in the description are flowcharts depicting examples of the methodology which may be used to implement a system for dynamic email addressing. It will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

In a preferred embodiment, the present invention can be implemented in software. Software programming code which embodies the present invention is typically accessed by a microprocessor from long-term, persistent storage media of some type, such as a flash drive or hard drive. The code may be distributed on such media or may be distributed from the memory or storage of one computer system over a network of some type to other computer systems for use by such other systems. Alternatively, the programming code may be embodied in the memory of the device and accessed by a microprocessor using an internal bus. The techniques and methods for embodying software programming code in memory, on physical media, and/or distributing software code via networks are well known and will not be further discussed herein.

Generally, program modules include routines, programs, objects, components, data structures and the like that perform particular tasks or implement particular abstract data types. Moreover, those skilled in the art will appreciate that the invention can be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

An exemplary system for implementing the invention includes a general purpose computing device such as the form of a conventional personal computer, a personal communication device or the like, including a processing unit, a system memory, and a system bus that couples various system components, including the system memory to the processing unit. The system bus may be any of several types of bus structures including a memory bus or memory controller, a peripheral bus, and a local bus using any of a variety of bus architectures. The system memory generally includes read-only memory (ROM) and random access memory (RAM). A basic input/output system (BIOS), containing the basic routines that help to transfer information between elements within the personal computer, such as during start-up, is stored in ROM. The personal computer may further include a hard disk drive for reading from and writing to a hard disk, a magnetic disk drive for reading from or writing to a removable magnetic disk. The hard disk drive and magnetic disk drive are connected to the system bus by a hard disk drive interface and a magnetic disk drive interface, respectively. The drives and their associated computer-readable media provide non-volatile storage of computer readable instructions, data structures, program modules and other data for the personal computer. Although the exemplary environment described herein employs a hard disk and a removable magnetic disk, it should be appreciated by those skilled in the art that other types of computer readable media which can store data that is accessible by a computer may also be used in the exemplary operating environment.

What is claimed is:

1. A system for dynamic email addressing comprising:
   a plurality of processors within an environment for processing electronic mail (email), wherein the environment also comprises,
      a proprietary data store;
      a proprietary mail transfer agent (EMTA); and
      a persona processor; wherein
   the plurality of processors execute instructions to perform a dynamic email addressing method comprising,
      the EMTA receiving an email message;
      the EMTA determining whether a domain of the email message is managed by the environment;
      if the email message is managed by the environment, the EMTA determining whether a sending mailbox associated with the email message is blacklisted, and if the sending mailbox is not blacklisted, persisting the email message for retrieval;
      the data store retrieving a list of messages from the EMTA;

for each message in the list of messages, retrieving a hash from the EMTA, downloading a message from the EMTA, and calculating a message hash; and if the hashes match, persisting the message in the data store, and determining a persona.

2. The system of claim 1, wherein a persona is based on one or more of:

a receiving email address; and content of message headers, including a sending email address, and the presence of a certain term in a subject line.

3. The system of claim 2, wherein a persona is defined by a user, and wherein the user can compose a message by typing a persona name, and the environment then addresses each recipient included in the persona.

4. The system of claim 1, wherein the method further comprises, if the email message is not managed by the environment, discarding the email message.

5. The system of claim 1, wherein the method further comprises, if the email message is blacklisted, noting the blacklisting action, and discarding the message.

6. The system of claim 1, wherein the method further comprises:

notifying a user of a new email message;

determining whether a persona is assigned; and if the persona is assigned, accepting a user assignment of persona for an email address of the new email message.

7. The system of claim 6, wherein the method further comprises, if the persona is assigned, accepting a change of persona from the user for the email address of the new email message.

8. The system of claim 6, wherein the method further comprises, if the persona is not assigned, accepting user actions in response to the determination that the persona is not assigned, including:

deleting the email message;

blacklisting the sender of the message;

blacklisting the persona of the message;

notifying the sender of the email message that the email address has been compromised;

selecting a new email address for the persona; and notifying authorized sender associated with the persona of the new email address for the persona.

9. A method for dynamic email addressing, the method comprising one or more processors within a proprietary email processing environment, wherein the one or more processors execute instructions to perform the method, the method comprising:

receiving an email message;

determining whether a domain of the email message is managed by the environment;

if the email message is managed by the environment, determining whether a sending mailbox associated with the email message is blacklisted, and if the sending mailbox is not blacklisted, persisting the email message for retrieval;

retrieving a list of messages from an email transfer agent of the environment (EMTA);

for each message in the list of messages, retrieving a hash from the EMTA, downloading a message from the EMTA, and calculating a message hash; and if the hashes match, persisting the message in the data store, and determining a persona.

10. The method of claim 9, wherein a persona is based on one or more of:

a receiving email address; and content of message headers, including a sending email address, and the presence of a certain term in a subject line.

11. The method of claim 10, wherein a persona is defined by a user, and wherein the user can compose a message by typing a persona name, and the environment then addresses each recipient included in the persona.

12. The method of claim 9, wherein the method further comprises, if the email message is not managed by the environment, discarding the email message.

13. The method of claim 9, wherein the method further comprises, if the email message is blacklisted, noting the blacklisting action, and discarding the message.

14. The method of claim 9, wherein the method further comprises:

notifying a user of a new email message;

determining whether a persona is assigned; and if the persona is assigned, accepting a user assignment of persona for an email address of the new email message.

15. The method of claim 14, wherein the method further comprises, if the persona is assigned, accepting a change of persona from the user for the email address of the new email message.

16. The method of claim 14, wherein the method further comprises, if the persona is not assigned, accepting user actions in response to the determination that the persona is not assigned, including:

deleting the email message;

blacklisting the sender of the message;

blacklisting the persona of the message;

notifying the sender of the email message that the email address has been compromised;

selecting a new email address for the persona; and notifying authorized sender associated with the persona of the new email address for the persona.

17. The method of claim 16, wherein the method further comprises:

conditionally notifying a user of the arrival of a new message via push notifications when they are available and enabled on a user's device; and enabling user to choose to selectively receive push notifications.

18. A non-transient computer readable medium having instruction stored thereon, which when executed by a processor cause a method to be performed, the method comprising:

receiving an email message;

determining whether a domain of the email message is managed by a proprietary environment comprising the processor, including a persona processor, at least one data store, and a proprietary email transfer agent (EMTA);

if the email message is managed by the environment, determining whether a sending mailbox associated with the email message is blacklisted, and if the sending mailbox is not blacklisted, persisting the email message for retrieval;

retrieving a list of messages from the EMTA;

for each message in the list of messages, retrieving a hash from the EMTA, downloading a message from the EMTA, and calculating a message hash; and if the hashes match, persisting the message in the data store, and determining a persona.

19. The method of claim 18, wherein a persona is based on one or more of:

a receiving email address; and content of message headers, including a sending email address, and the presence of a certain term in a subject line.

20. The method of claim 19, wherein a persona is defined by a user, and wherein the user can compose a message by typing a persona name, and the environment then addresses each recipient included in the persona.

21. The method of claim 19, wherein the method further comprises, if the email message is not managed by the environment, discarding the email message.

22. The method of claim 18, wherein the method further comprises, if the email message is blacklisted, noting the blacklisting action, and discarding the message.

23. The method of claim 18, wherein the method further comprises:
   notifying a user of a new email message;
   determining whether a persona is assigned; and
   if the persona is assigned, accepting a user assignment of persona for an email address of the new email message.

24. The method of claim 23, wherein the method further comprises, if the persona is assigned, accepting a change of persona from the user for the email address of the new email message.

25. The method of claim 24, wherein the method further comprises, if the persona is not assigned, accepting user actions in response to the determination that the persona is not assigned, including:
   deleting the email message;
   blacklisting the sender of the message;
   blacklisting the persona of the message;
   notifying the sender of the email message that the email address has been compromised;
   selecting a new email address for the persona; and
   notifying authorized sender associated with the persona of the new email address for the persona.

* * * * *